(12) United States Patent
Priev et al.

(10) Patent No.: US 9,449,200 B2
(45) Date of Patent: Sep. 20, 2016

(54) METHODS, SYSTEMS AND APPARATUS TO SECURE DEVICES VIA PHYSICAL AND/OR VIRTUAL LOCKING

(71) Applicant: Intel Corporation, Santa Clara, CA (US)

(72) Inventors: Avi Priev, Modi'in (IL); Alex Nayshtut, Gan Yavne (IL); Hong Li, El Dorado Hills, CA (US); Shahar Porat, Ein Carmel (IL)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 14/229,422

(22) Filed: Mar. 28, 2014

(65) Prior Publication Data

US 2015/0278558 A1    Oct. 1, 2015

(51) Int. Cl.
    *G06F 21/86*   (2013.01)
    *G06F 21/88*   (2013.01)

(52) U.S. Cl.
    CPC ............. *G06F 21/88* (2013.01); *G06F 21/86* (2013.01)

(58) Field of Classification Search
    CPC ............................... G06F 21/88; G06F 21/86
    USPC ........................................................ 726/35
    See application file for complete search history.

(56) References Cited

U.S. PATENT DOCUMENTS

| 2003/0216143 A1* | 11/2003 | Roese et al. ............... 455/456.1 |
| 2004/0203895 A1 | 10/2004 | Balasuriya |
| 2005/0231365 A1 | 10/2005 | Tester et al. |
| 2010/0120406 A1 | 5/2010 | Banga et al. |
| 2012/0173732 A1 | 7/2012 | Sullivan |
| 2012/0242481 A1 | 9/2012 | Gernandt et al. |
| 2013/0279689 A1* | 10/2013 | Obaidi ........................... 380/28 |
| 2015/0094023 A1* | 4/2015 | Abramson et al. ........... 455/411 |
| 2015/0168101 A1* | 6/2015 | Hyde et al. |

OTHER PUBLICATIONS

Arduino RFID Door Lock by pcmofo Aug. 9, 2010.*
http://www.engadget.com/2010/07/28/kensingtons-laptop-locking-station-is-a-thiefs-worst-nightmare/Darren Murph Jul. 28, 2010.*
Wireless Power Consortium, "System Description Wireless Power Transfer vol. 1: Low Power, Part 1: Interface Definition Version 1.1.2," Jun. 2013 (186 pages).
Wikipedia, "Kensington Security Slot," retrieved from <http://en.wikipedia.org/w/index.php?title=Kensington_Security_Slot&print>, retrieved on Feb. 16, 2014 (2 pages).
Wireless Power Consortium, "Guidelines for Automotive Aftermarket Chargers," retrieved from <http://wirelesspowerconsortium.com>, retrieved on Feb. 16, 2014 (2 pages).
International Searching Authority, "International Search Report and Written Opinion," issued in connection with International Patent Application No. PCT/US2015/015431, mailed May 1, 2015 (12 pages).
Taiwan Patent Office, "Search Report", issued in connection with Taiwan Patent Application No. 104104393, dated Mar. 3, 2016 (2 pages).

* cited by examiner

*Primary Examiner* — Kambiz Zand
*Assistant Examiner* — Benjamin Kaplan
(74) *Attorney, Agent, or Firm* — Hanley, Flight & Zimmerman, LLC

(57) ABSTRACT

Methods, systems, apparatus and articles of manufacture are disclosed to secure devices. An example disclosed apparatus includes a platform detector to determine when the device is within a threshold proximity to a platform, a device locking manager to initiate a locking service for the device when within the threshold proximity, and a device tampering manager to initiate a tampering remedy in response to detecting an indication of tampering.

20 Claims, 8 Drawing Sheets

METHODS, SYSTEMS AND APPARATUS TO SECURE DEVICES VIA PHYSICAL AND/OR VIRTUAL LOCKING

FIELD OF THE DISCLOSURE

This disclosure relates generally to computing device security, and, more particularly, to methods, systems and apparatus to secure devices via physical and/or virtual locking.

BACKGROUND

In recent years, computing devices have become more energy efficient and smaller in size. Such reduced sizes have allowed computing devices to be utilized by users in a mobile environment, regardless of whether the users are at work, at home or travelling. However, the reduced sizes of the computing devices also increases one or more risks associated with theft. Efforts to reduce the risk of theft include attaching a cable between the computing device and a stationary structure, such as a table or a wall. Such efforts require, in part, that the user maintain possession of a key or other locking mechanism, a specialized lock attached to the computing device, and/or a cable to secure the computing device to the stationary structure.

DETAILED DESCRIPTION

While attaching a computing device, such as a laptop, to a stationary structure via a cable may deter and/or otherwise prevent theft of the computing device, the cable and complimentary lock must also be transported by the user of the computing device. In some examples, the computing device includes a built-in locking interface with which to attach the cable, such as a Kensington Security Slot® (also referred to as a K-Slot®) designed by Kensington Computer Products Group®. In the event a device is connected to the locking interface (e.g., K-Slot®) via a lock and complimentary cable, attempts to remove the device by force result in destruction to one or more portions of the computing device. In effect, if the damage to the computing device caused by theft exceeds the benefit of stealing the computing device, then the computing device is deemed to be "locked," even if it is ultimately forcibly removed.

In some examples, locking interfaces (e.g., the K-Slot® security locking mechanisms) are factory installed at the time of computing device manufacture and are particularly well suited for computing devices large enough to house various locking interface material(s). However, relatively smaller computing devices, such as ultrabooks (UBs), tablets (e.g., Apple® iPad®) and/or mobile telephones (e.g., smartphones such as Android® devices, Apple® iPhone®, etc.) have neither factory-installed physical security locking mechanisms/interfaces nor adequate physical space to contain such physical security locking mechanisms to deter and/or otherwise prevent theft.

Example methods, apparatus, systems and/or articles of manufacture disclosed herein facilitate physical locking and/or virtual locking in a manner that accommodates computing devices of any size. As used herein, "locking" may refer to either physical locking or virtual locking. Also as used herein, and described in further detail below, "virtual locking" refers to proximity detection and wireless communication between the computing device relative to a monitored location, such as a charging station, office desk, etc. In some examples, virtual locking does not include one or more restraining forces exhibited between the security platform 104 and the device 106. Additionally, such examples disclosed herein facilitate emergency notification(s) associated with attempted and/or successful theft of the computing device(s). Examples disclosed herein facilitate computing device security without a requirement that the user and/or owner of the computing device carry cables, locks and/or physical keys.

Figure 1:
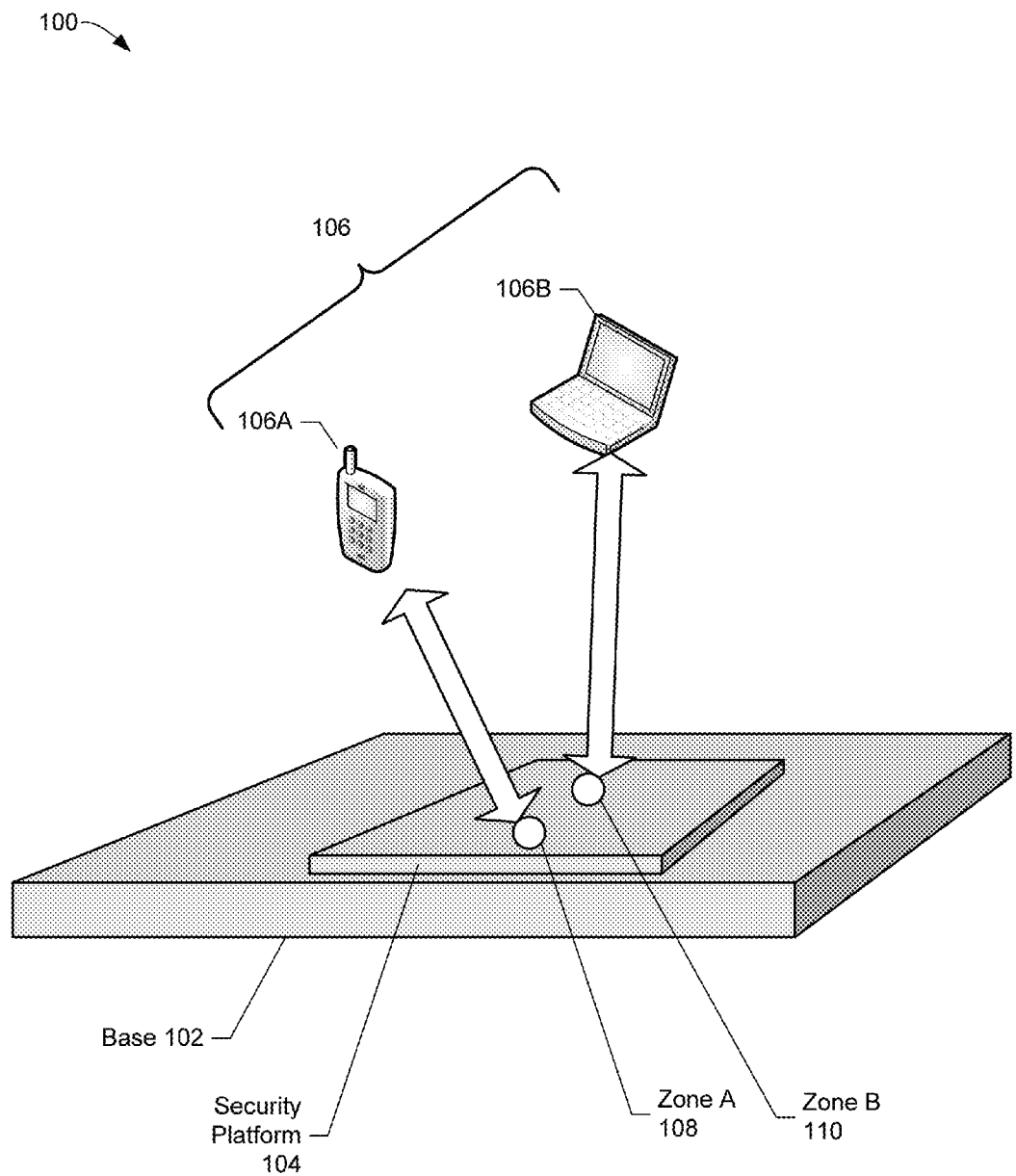
FIG. 1 is a schematic illustration of a security system constructed in accordance with the teachings of this disclosure to secure devices.

FIG. 1 illustrates an example system 100 to secure devices that includes a base 102, a security platform 104 attached to the base structure 102 and one or more computing devices 106 to be removably secured to the security platform 104. In the illustrated example of FIG. 1, the base structure 102 may include a wall, a table and/or any type of structure that is generally outside an ability for a human to pick-up, move and/or otherwise conveniently remove.

The example security platform 104 of FIG. 1 may be immovably connected to the example base 102 (e.g., an immovable structure) in any manner, such as bolts, clamps and/or adhesives. Additionally, the example security platform 104 may facilitate one or more security techniques, as described in further detail below, and may also facilitate one or more charging features for the computing devices 106. For example, if a user places a first device in proximity to a first zone (Zone A 108), then a corresponding charging interface of the example security platform 104 may be energized to provide the first device (e.g., a mobile phone 106A) with power. Similarly, if a user places a second device in proximity to a second zone (Zone B 110), then a corresponding charging interface of the example security platform 104 may be energized to provide the second device (e.g., a tablet 106B) with power. The example computing devices 106 of FIG. 1 may include, but are not limited to the mobile telephone 106A, the tablet 106B, a laptop, an ultrabook, a smartwatch, a headset (e.g., a Bluetooth headset), etc.

Power to the example security platform 104 of FIG. 1 may be provided via one or more electrical outlets, and power to the devices 106 may be facilitated by wireless charging technology, such as technologies following standards promulgated by the Wireless Power Consortium (Qi System Description Wireless Power Transfer, Version 1.1.2, June 2013), which is incorporated by reference herein in its entirety.

Figure 2:
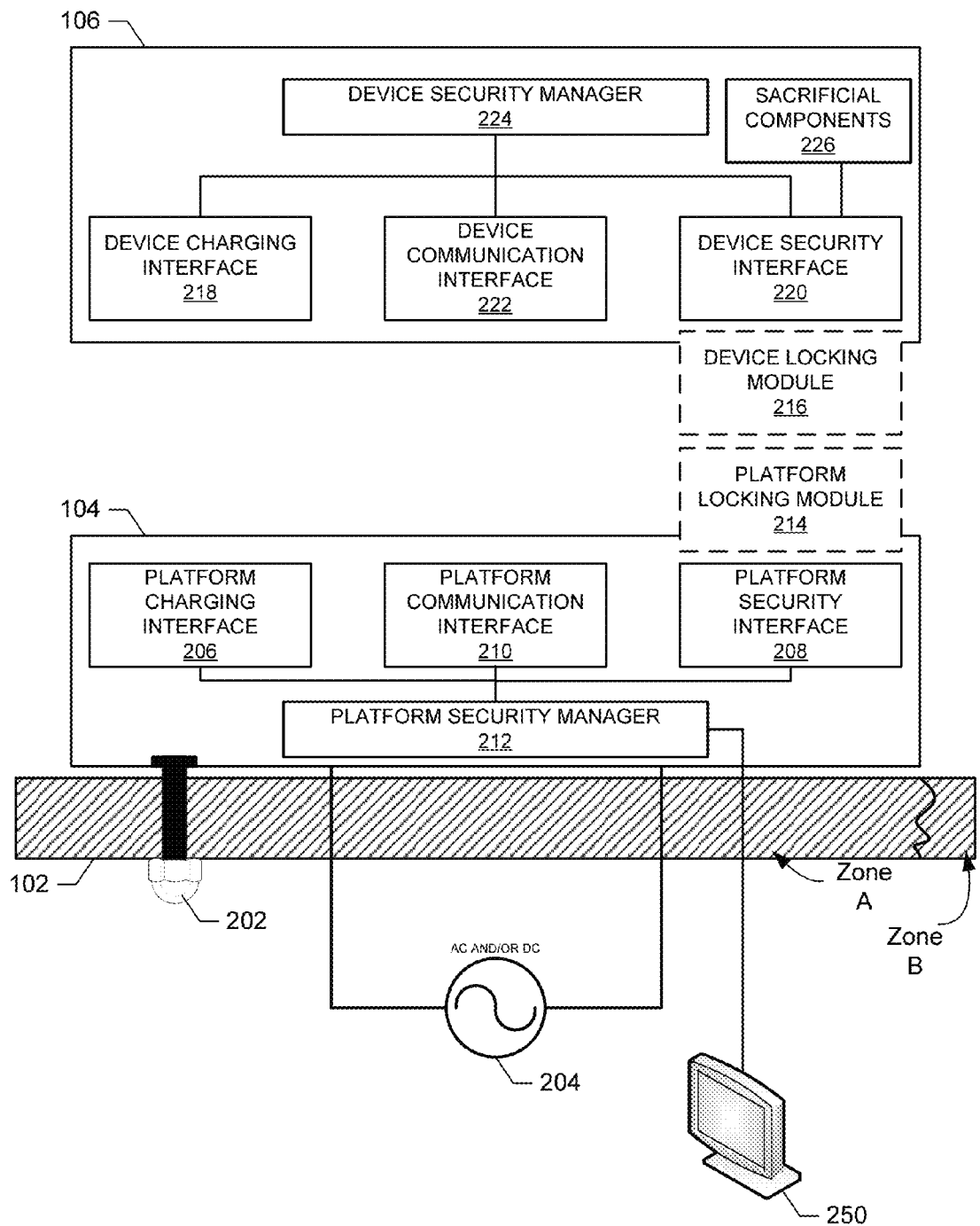
FIG. 2 is a schematic illustration of an example platform and device to be secured of FIG. 1.

FIG. 2 illustrates a cross-sectional view of the example base 102, the example security platform 104 and the example device 106 of FIG. 1. In the illustrated example of FIG. 2, the base 102 is attached to the example security platform 104 via securable fastener(s) 202 (e.g., a bolt and nut), and an electrical outlet 204 provides electrical power for operation of the example security platform 104. The example security platform 104 also includes two example zones (e.g., Zone A 108 and Zone B 110) to accommodate two separate computing devices (e.g., the mobile phone 106a and the tablet 106b), which may be provided with power (e.g., power for battery charging), monitored for removal and/or attempted removal from the example security platform 104, and/or securely restrained to the example security platform 104. While the illustrated example of FIG. 2 includes two separate zones (i.e., Zone A 108 and Zone B 110), any number of zones may be considered in connection with example methods, apparatus, systems and/or articles of manufacture disclosed herein. Additionally, while the example security platform of FIG. 2 may include any number of zones, only components associated with Zone A 108 will be described herein for simplicity of explanation.

In the illustrated example of FIG. 2, Zone A 108 of the security platform 104 includes a platform charging interface 206, a platform security interface 208 and a platform communication interface 210 that controls a corresponding platform user interface (UI) 250. Additionally, the example security platform 102 includes an example platform security manager 212 to invoke one or more services of the example platform charging interface 206, the example platform security interface 208 and/or the example platform communication interface 210, as described in further detail below. In operation, the example platform security interface 208 controls an example platform locking module 214 that lockably interfaces with a corresponding device locking module 216 attached to the example device 106 (e.g., a wireless telephone). In some examples, the platform locking module 214 includes an electromagnet that, when energized, locks the example device locking module 216 to prevent the example device 106 from being physically removed from the example platform 104. The example device locking module 216 may be constructed of one or more materials that exhibit ferromagnetic properties, such as Cobalt, Iron, Iron oxide, Copper, Nickel, etc.

In some examples, the platform locking module 214 includes one or more polymer film(s) (polymer composite materials) that change magnetic and/or mechanical properties in response to particular conditions or control signals. For example, in response to a lock control signal applied to the example platform locking module 214, corresponding composite magnetic particles may be aligned in a manner that increases a resulting magnetic force with the example device locking module 216, thereby securing the example device 106 to the example platform 104 in a manner that consumes less power than energizing an electromagnet. However, in response to an unlock control signal applied to the example platform locking module 214, corresponding composite magnetic particles of the example platform locking module 214 may be disaligned and/or otherwise randomized to reduce a resulting magnetic force with the example device locking module 216, thereby releasing the example device 106 from the example platform 104.

In the illustrated example of FIG. 2, the device 106 includes a device charging interface 218, a device security interface 220, a device communication interface 222, a device security manager 224 and one or more sacrificial component(s) 226, as described in further detail below. In operation, the example device charging interface 218 is electrically coupled to the example platform charging interface 206 of the example security platform 104 in a manner consistent with one or more wireless charging technologies, such as one or more technologies following standards promulgated by the Wireless Power Consortium (Qi System Description Wireless Power Transfer, Version 1.1.2, June 2013), which is incorporated by reference herein in its entirety. As described in further detail below, the example platform charging interface 206 may enable and/or otherwise activate charging services for the example device 106 in response to detecting the presence of the example device charging interface 218. The example platform security interface 208 may detect the presence of the example device security interface 220 when the example device 106 is within a suitable range of communication.

In some examples, the platform communication interface 210 of the security platform 104 detects and/or otherwise negotiates communication with the device communication interface 222 via one or more communication technologies. Communication technologies that may be used by the example platform communication interface 210 and the example device communication interface 222 include, but are not limited to, Bluetooth® communication protocols, near field communication (NFC) protocols and Wi-Fi® communication protocols. In some examples, the platform security interface 208 determines whether the device 106 is authorized to use one or more features of the platform 104, such as charging features and/or security features. Depending on a security profile for the example device 106, which may be stored in the example platform security manager 212, the example platform charging interface 206 may be invoked to provide electrical power to the example device, and/or the example platform security interface 208 may be invoked to physically secure the example device 106 to the example platform 104.

In the event the example device 106 is to be physically secured to the example security platform 104, the example platform locking module 214 may be energized and/or otherwise activated to enable a securing force (e.g., a magnetic force, a physical interlock, etc.). In some examples, the platform locking module 214 exhibits a magnetic force that secures the device locking module 216 in a particular orientation. For example, the device locking module 216 may be a metallic (e.g., ferromagnetic metal) piece (e.g., a coin, a washer, etc.) that is physically connected to the device 106 and magnetically attracted to the platform locking module 214. As such, when the example platform locking module 214 is activated and/or otherwise energized, the device is constrained to the example security platform to discourage and/or prevent removal of the example device 106.

In some examples, even though the device 106 is constrained and/or otherwise immobilized by one or more forces acting between the platform locking module 214 and the device locking module 216 (e.g., a magnetic platform and corresponding ferromagnetic metallic device locking module), a thief may still apply a sufficient amount of force to remove the device 106. Example methods, apparatus, systems and/or articles of manufacture disclosed herein monitor for one or more instances of removal attempts of the device 106 and provide corresponding warnings and/or communications in response thereof. Additionally, example methods, apparatus, systems and/or articles of manufacture disclosed herein physically connect the device locking module 216 to one or more sacrificial component(s) 226 such that, if enough removal force is applied by a thief, the device 106 is damaged during a removal attempt. As described above, if the amount of damage to the example device 106 exceeds the motivation to steal the device, then the example device 106 is deemed to be secure.

The example sacrificial component(s) 226 of the example device 206 may include, but are not limited to, a processor, graphics circuitry, memory components, digital signal processor(s) (DSPs), radio frequency (RF) transmitters/receivers and/or audio components. One or more the example sacrificial component(s) 226 may include a physical link and/or connection to the example device locking module 216 such that, when a threshold amount of force occurs therebetween, the sacrificial component(s) 226 are damaged. For example, in the event the example device 106 has not been unlocked by the example security platform 104 (e.g., the example platform security interface 208 has not de-energized and/or otherwise unlocked the platform locking module 214), the removal force(s) exerted by an attempted thief eventually cause the bond between the sacrificial component(s) 226 and the example device locking module 216 to damage the example sacrificial component(s) 226. In some examples, the device locking module 216 is physically connected to the one or more sacrificial component(s) 226 by an epoxy compound or glue, in which the force exhibited by the thief is applied to the sacrificial component(s) 226 to cause damage.

To prevent and/or otherwise minimize damage to the sacrificial component(s) 226 when one or more removal attempts occur without an associated intent to steal the example device 106, example methods, apparatus, systems and/or articles of manufacture disclosed herein facilitate removal notification messages. For example, the device locking module 216 includes one or more force sensors (e.g., a strain gauge) that is monitored by the device security interface 220. Different notification messages may be generated by the example device security manager 224 based on different force values detected by the example force sensors of the example device locking module 216. For example, in the event of a casual attempt to remove the device 106 from the security platform 104 by a user, in which the user's removal force satisfies a first threshold (e.g., primary stage tampering), a first removal notification message may be generated as an audio and/or visual prompt by the device 106 and/or the corresponding security platform 104 with which the device 106 is secured. The example first removal notification message may be configured to invoke a tone, flashing indicator lights, and/or an audible/visual message stating, for example, "Please note that this device is secured to the platform. Enter password to remove."

In the event a removal attempt of the example device 106 occurs, in which the user's removal force satisfies and/or otherwise exceeds a second threshold (e.g., secondary stage tampering), a second removal notification message may be generated with one or more alternate messages. For example, while the first removal force that is lower than the second removal force may be indicative of a casual attempt at device 106 removal by a user that is unaware of the locked/secured status of the device 106, the second removal force may be indicative of a theft attempt. As such, the second removal notification message may be generated in a manner that is relatively louder than the first removal notification message. The example second removal notification message may be configured to invoke a relatively louder tone, alternate indicator light pattern and/or one or more alternate audible visual message(s) stating, for example, "Further attempts to remove this device will result in permanent damage! Discontinue removal attempts until the authorized credentials are entered!"

In some examples, the security platform 104 manages virtual security instead of physical security for the device 106, in which the platform locking module 214 does not establish a physical locking force (e.g., a magnetic coupling) with the device 106. For example, the platform communication interface 210 detects a threshold proximity to the device communication interface 222 of the device 106. In the event the proximity of the example device 106 exceeds the threshold (e.g., a particular distance), as determined by one or both of the platform communication interface 210 and/or the device communication interface 222, then the example device security manager 224 invokes one or more removal notification messages. In some examples, a first removal notification message may be presented to the user/thief after a first time period that is indicative of primary stage tampering (e.g., a casual removal of the device 106 from the security platform 104), and a second notification message may be presented to the user/thief after a second time period indicative of secondary stage tampering (e.g., relatively prolonged violation of the proximity threshold).

The second notification message may provide additional information to deter continued theft attempts by stating, for example, "Failure to return this device to the security platform will result in device tracking and law enforcement assistance." The example device security interface 220 or the device security manager 224 of the device 106 may include an auxiliary power source (e.g., battery) and/or auxiliary communication transmitters/receivers that are independent of those that may be part of the device 106 itself. For example, a thief may respond to the second notification message by removing a battery of the device 106 in an effort to disconnect power to one or more communication devices that are part of the normal operation of the device 106 (e.g., Wi-Fi® radio(s), Bluetooth® radio(s), cell transceivers, etc.). In some devices, such as the example device 106 of FIG. 2, a standard battery is user serviceable and/or accessible by the user. As such, removal of the standard battery prevents corresponding standard features of the device from operating. However, the auxiliary power source and/or auxiliary communication devices of the example device security manager 224 may be incorporated into the example device 106 in a manner inaccessible to the user, thereby making removal attempts futile and allowing the device 106 auxiliary communication devices to contact one or more of security personnel, law enforcement personnel and/or the true owner of the example device 106.

In some examples, the device security manager 224 includes a self-destruction engine to render a stolen device (such as the example device 106 of FIG. 2) inoperable in the event prolonged unauthorized absence from the security platform 104. As described in further detail below, the self-destruction engine may mechanically, chemically and/or electrically interface with the example sacrificial component(s) 226 to result in permanent damage to such sacrificial component(s) 226 in response to a command from the example device security manager 224.

Figure 3:
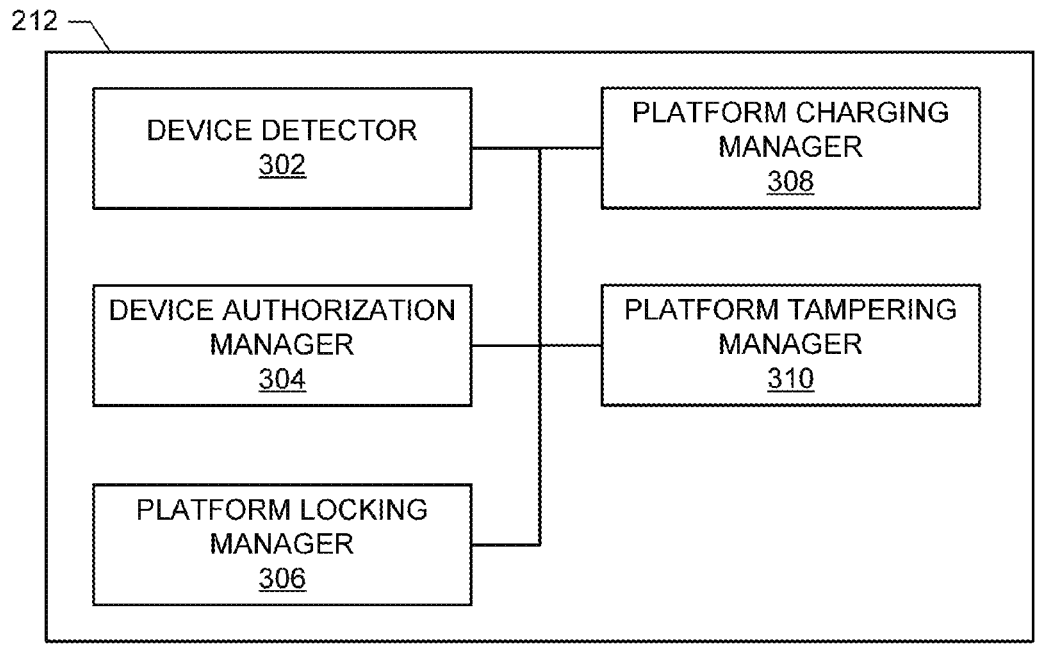
FIG. 3 is a schematic of an example platform security manager of FIGS. 1 and 2.

FIG. 3 illustrates additional detail of the example platform security manager 212 of FIG. 2. In the illustrated example of FIG. 3, the platform security manager 212 includes a device detector 302, a device authorization manager 304, a platform locking manager 306, a platform charging manager 308 and a platform tampering manager 310. In operation, the example device detector 302 invokes the example platform communication interface 210 on a scheduled, periodic, aperiodic and/or manual basis to determine whether a device (e.g., the device 106 of FIGS. 1 and 2) is proximate to the example security platform 104. As described above, the example platform communication interface 210 and the example communication interface 222 include any type of communication technology to determine a proximity of a device including, but not limited to, Bluetooth® communication protocols, near field communication (NFC) protocols and Wi-Fi® communication protocols.

After determining that a device is proximate to the example security platform 104, the example device authorization manager 304 determines whether the detected device is authorized to receive one or more services/features provided by the example security platform 104. In some examples, the device authorization manager 304 stores a list of authorized devices and their corresponding service privileges, in which the list of authorized devices may be identified by broadcast credentials and/or other information associated with the device that is proximate the example security platform 104. For example, devices using Bluetooth® communication protocols may broadcast discovery information, such as a media access control (MAC) address, devices using Wi-FI® communication protocols may broadcast a service set identification (SSID), and NFC protocols may share MAC addresses, Internet protocol addresses and/or other identifiers to reveal an indication of identity. Service privileges that a platform may provide to one or more devices include charging services, physical security services and/or virtual security services. In some examples, if a detected device does not have any corresponding service privileges (e.g., the detected device identification credentials are not located in the list of authorized devices stored by the example device authorization manager 304), then the example device authorization manager 304 may provide one or more services on a temporary basis (e.g., guest services).

In some examples, the platform locking manager 306 activates the example platform security interface 208 to invoke physical locking capabilities between the detected device and the security platform. Additionally or alternatively, the example platform charging manager 308 may invoke the example platform charging interface 206 if the proximate device has charging privileges and/or guest privileges (e.g., to allow a guest device to charge for a threshold amount of time). After a detected device proximate to the example security platform 104 begins charging and/or is physically secured to the platform 104 (e.g., via an energized electromagnet), the example platform security manager 212 monitors the device for one or more indications of unauthorized removal.

The example platform security manager 212 monitors the example platform 104 on a manual, periodic, aperiodic and/or scheduled basis. In particular, the example platform tampering manager 310 is invoked by the example platform security manager 212 to determine whether one or more indications of tampering of a secured device occur. As described above, tampering may occur when the example device 106 is physically secured to the example platform 104 (e.g., via an electromagnet interface), or when the example device 106 is virtually secured based on proximity to the example platform 104. If an indication of tampering occurs, such as a first threshold amount of force applied to the device 106 as detected by the example platform tampering manager 310, then the example platform communication interface 210 generates a notification message to be displayed and/or otherwise presented on the device 106 and/or the example platform interface 250. Additionally or alternatively, in response to the example platform tampering manager 310 detecting an indication of tampering, an e-mail message, text message, telephone call and/or other notification may be generated to inform an owner or manager of the device 106 of tampering or possible theft attempt(s). The example notification may include a request that authorized credentials be provided (e.g., a password) to disarm the security and, if such credentials are received and/or otherwise retrieved by the example platform security manager 212, the security efforts of the example platform 104 may be released and/or otherwise disarmed. The credentials may be provided via a user interface of the example device, or via the example platform interface 250.

In some examples, if the indication of tampering continues for a period of time in which the applied force does not cease, the device proximity does not return to a threshold distance, or authorized credentials are not provided and/or otherwise received, the example platform communication interface 210 invokes a secondary level alert having a relatively greater urgency. For example, the secondary level alert may invoke an audible alarm having a greater volume level and/or a warding message explaining that irreversible damage to the device will occur if it is either not returned to the proximity of the example platform 104 and/or authorized credentials are not provided and/or otherwise received. In the event that the indication of tampering persists, then the platform security manager 212 may invoke the example platform tampering manager 310 to cause the example device 106 to initiate a self-destruction command and/or activate auxiliary communication devices to solicit assistance from security personnel and/or law enforcement.

Figure 4:
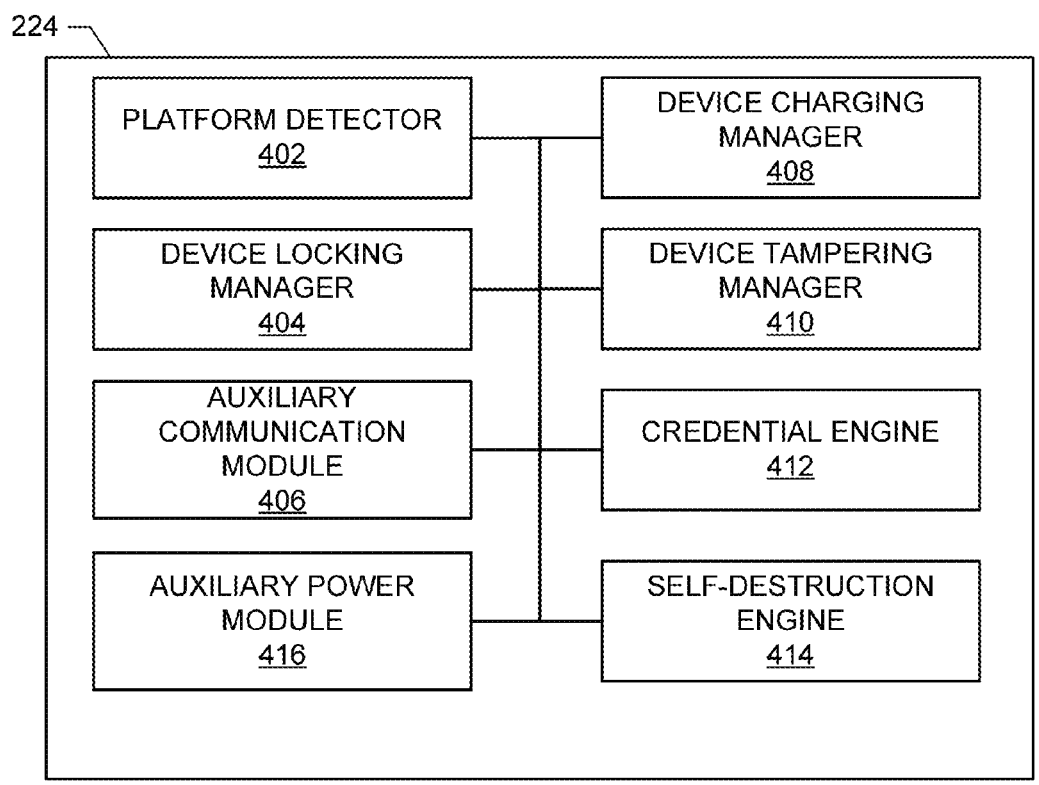
FIG. 4 is a schematic of an example device security manager of FIGS. 1 and 2.

FIG. 4 illustrates additional detail of the example device security manager 224 of FIG. 2. In the illustrated example of FIG. 4, the device security manager 224 includes a platform detector 402, a device locking manager 404, an auxiliary communication module 406, a device charging manager 408, a device tampering manager 410, a credential engine 412, a self-destruction engine 414 and an auxiliary power module 416. In operation, the example platform detector 402 determines whether an example platform 104 is in proximity to the example device 106 and, if so, invokes the device security manager 224 to determine whether the device 106 is authorized to use one or more services offered by the example security platform 104. In some examples, the device 106 has no prior established relationship with the security platform 104, but may negotiate guest and/or temporary usage privileges with the example security platform 104. If the example security platform 104 offers physical locking services, as determined by the example device locking manager 404, then the example device 106 may request locking activation. In some examples, the security platform 104 offers charging services and the example device charging manager 408 may request charging activation services of the security platform 104. Once physical security services, charging services and/or virtual security services are activated, the example device security manager 224 monitors device conditions.

While monitoring device conditions, the example device tampering manager 410 determines whether an indication of tampering occurs. As described above, tampering may be deemed evident in response to one or more threshold forces detected by a force sensor, or may be deemed evident by detecting a loss of proximity to the example security platform 104. However, if the example device 106 has not requested and/or otherwise activated security features of the security platform 104, the example device charging manager 408 may monitor a charging state of the example device 106.

In response to the example device tampering manager 410 identifying an indication of tampering, the example credential engine 412 requests credentials to be entered on the device. In some examples, the device does not include an active user interface with which to enter credentials and, instead, the example credential engine 412 invokes the example platform security manager 212 of the security platform 104 to invoke a credential entry prompt on the example platform interface 250. Absent receipt of authorized credentials, the example self-destruct engine 414 may proceed to cripple, destroy and/or otherwise incapacitate the example sacrificial component(s) 226. Additionally or alternatively, the example self-destruct engine 414 may proceed to invoke the auxiliary communications module 406 to enable one or more messages to be transmitted to the device owner (e.g., via e-mail, text, etc.) and/or to security personnel.

On the other hand, in the event authorized credentials are received and/or otherwise detected by the example credential engine 412, then the device security manager 224 sends an indication of correct credential entry to the platform to cause the physical and/or virtual security to be released. If the credentials are entered, instead, via the example platform interface 250, then the security platform 104 releases the physical and/or virtual security and informs the example device security manager 224 of the same.

While an example manner of implementing the system 100 to secure devices of FIG. 1 is illustrated in FIGS. 2-4, one or more of the elements, processes and/or devices illustrated in FIGS. 1-4 may be combined, divided, rearranged, omitted, eliminated and/or implemented in any other way. Further, the example platform charging interface, the example platform security interface 208, the example platform communication interface 210, the example platform locking module 214, the example platform interface 250, the example device locking module 216, the example device charging interface 218, the example device security interface 220, the example device communication interface 222, the example sacrificial components 226, the example device detector 302, the example device authorization manager 304, the example platform locking manager 306, the example platform charging manager 308, the example platform tampering manager 310, the example platform detector 402, the example device locking manager 404, the example auxiliary communication module 406, the example device charging manager 408, the example device tampering manager 410, the example credential engine 412, the example self-destruction engine 414, the example auxiliary power module 416 and/or, more generally, the example platform security manager 212 and the example device security manager 224 of FIGS. 3 and 4 may be implemented by hardware, software, firmware and/or any combination of hardware, software and/or firmware. Thus, for example, any of the example platform charging interface, the example platform security interface 208, the example platform communication interface 210, the example platform locking module 214, the example platform interface 250, the example device locking module 216, the example device charging interface 218, the example device security interface 220, the example device communication interface 222, the example sacrificial components 226, the example device detector 302, the example device authorization manager 304, the example platform locking manager 306, the example platform charging manager 308, the example platform tampering manager 310, the example platform detector 402, the example device locking manager 404, the example auxiliary communication module 406, the example device charging manager 408, the example device tampering manager 410, the example credential engine 412, the example self-destruction engine 414, the example auxiliary power module 416 and/or, more generally, the example platform security manager 212 and the example device security manager 224 of FIGS. 3 and 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, platform charging interface, the example platform security interface 208, the example platform communication interface 210, the example platform locking module 214, the example platform interface 250, the example device locking module 216, the example device charging interface 218, the example device security interface 220, the example device communication interface 222, the example sacrificial components 226, the example device detector 302, the example device authorization manager 304, the example platform locking manager 306, the example platform charging manager 308, the example platform tampering manager 310, the example platform detector 402, the example device locking manager 404, the example auxiliary communication module 406, the example device charging manager 408, the example device tampering manager 410, the example credential engine 412, the example self-destruction engine 414, the example auxiliary power module 416 and/or, more generally, the example platform security manager 212 and the example device security manager 224 of FIGS. 3 and 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example platform security manager 212 and/or the example device security manager 224 of FIGS. 3 and 4 may include one or more elements, processes and/or devices in addition to, or instead of, those illustrated in FIGS. 1-4, and/or may include more than one of any or all of the illustrated elements, processes and devices.

A flowchart representative of example machine readable instructions for implementing the system 100 of FIGS. 1-4 is shown in FIGS. 5A, 5B, 6A and 6B. In these examples, the machine readable instructions comprise program(s) for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program(s) and/or parts thereof could alternatively be executed by a device other than the processor 712 and/or embodied in firmware or dedicated hardware. Further, although the example program(s) is/are described with reference to the flowcharts illustrated in FIGS. 5A, 5B, 6A and 6B, many other methods of implementing the example system 100 may alternatively be used. For example, the order of execution of the blocks may be changed, and/or some of the blocks described may be changed, eliminated, or combined.

As mentioned above, the example processes of FIGS. 5A, 5B, 6A and 6B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5A, 5B, 6A and 6B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5A:
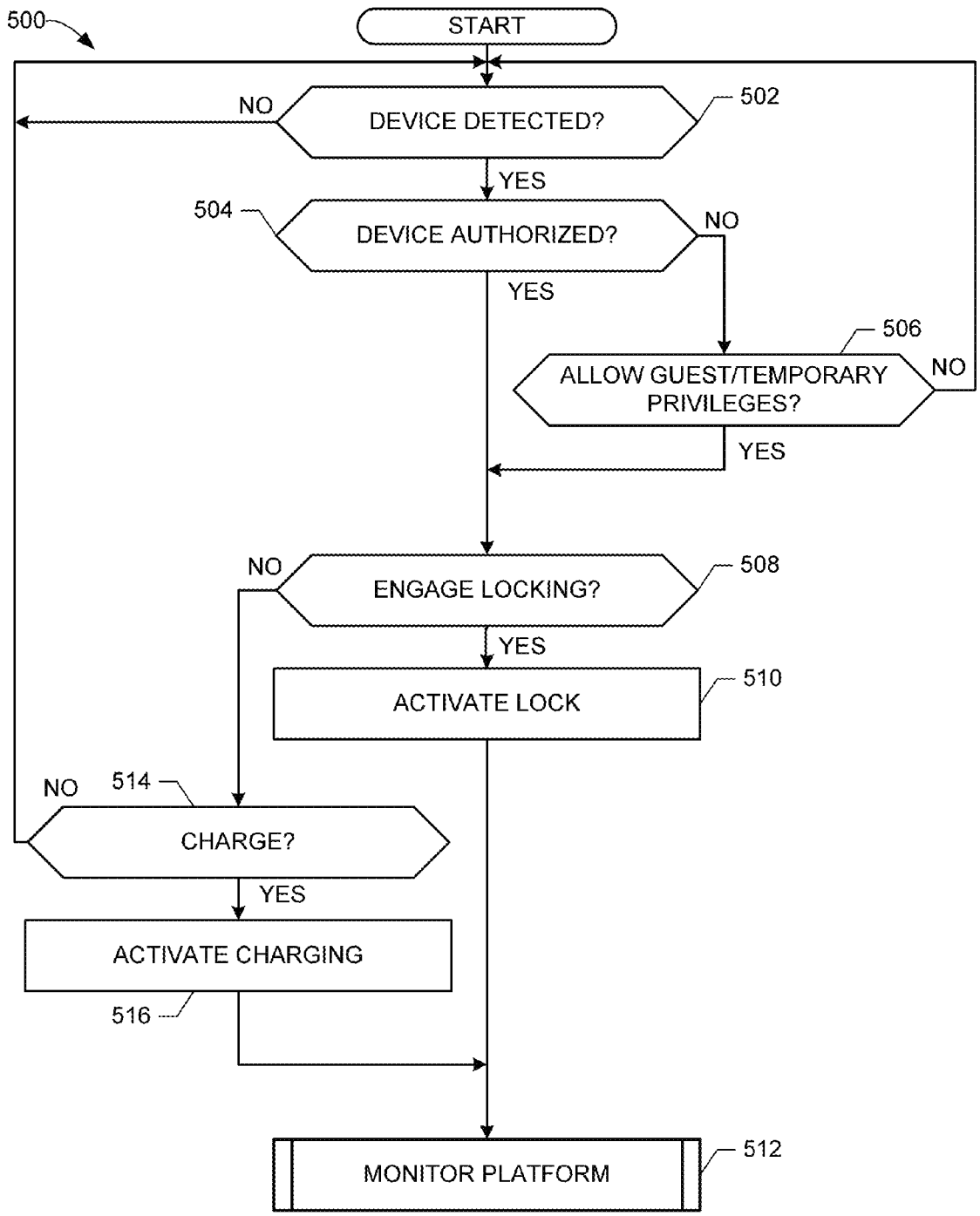
FIGS. 5A and 5B are flowcharts representative of example machine readable instructions that may be executed by a device to be secured in a manner consistent with the teachings of this disclosure.

The program 500 of FIG. 5A describes example operation of the example security platform 104 and the example platform security manager 212 and begins at block 502 where the example device detector 302 of the example platform security manager 212 determines whether one or more devices are in proximity to the example security platform 104. If not, then the example device detector 302 continues to monitor for a device (block 502). In the event the example device detector 302 identifies a device in proximity to the example security platform 104 (block 502), the example device authentication manager 304 determines whether the detected device is authorized to use one or more services of the example security platform 104 (block 504). Device authorization may be determined by a profile that lists device identifiers (e.g., MAC address values) and corresponding usage privileges for the example security platform 104. In the event the device is not authorized to use one or more services of the example security platform 104 (block 504), the example device authorization manager 304 may allow temporary and/or guest privileges to the newly detected device (block 506). However, if temporary and/or guest usage privileges are not authorized for a detected device not having a pre-established profile (block 506), then control returns to block 502 where the example device detector 302 continues to monitor for devices proximate the example security platform 104.

On the other hand, in the event temporary and/or guest usage privileges are authorized for a detected device without a pre-established profile (block 506), or if the detected device has a profile and is authorized to use the example security platform 104 (block 504), then the example platform locking manager 306 determines whether the detected device should be locked (block 508). If so, then the example platform locking manager 306 activates a physical lock, a virtual lock, or both (block 510). For example, if the detected device (e.g., device 106) is to be physically locked/secured to the security platform 104, then the platform locking manager 306 invokes the example platform security interface 208 to enable physical locking capabilities of the example platform locking module 214. As described above, the example platform locking module 214 may use any type of locking technique to restrict relative movement between the example device 106 and the example security platform 104.

In some examples, the platform locking manager 306 may not invoke a physical locking mechanism for the example device 106 and, instead, invoke virtual locking. As described above, and in further detail below, virtual locking secures the example device 106 by monitoring for one or more attempts to remove it from a threshold proximity/distance and, if such a distance is exceeded, one or more notifications is transmitted to one or more personnel. The example platform security manager 212 monitors the example device 106 for either or both physical and virtual locking (block 512), as described in further detail below.

In some examples, the platform locking manager does not apply either physical or virtual locking (block 508), and the example platform charging manager 308 determines whether charging services are to be provided to the example device 106 (block 514). If not, control returns to block 502, otherwise the example platform charging interface 206 energizes charging services of the example security platform 104 (block 516).

Figure 5B:
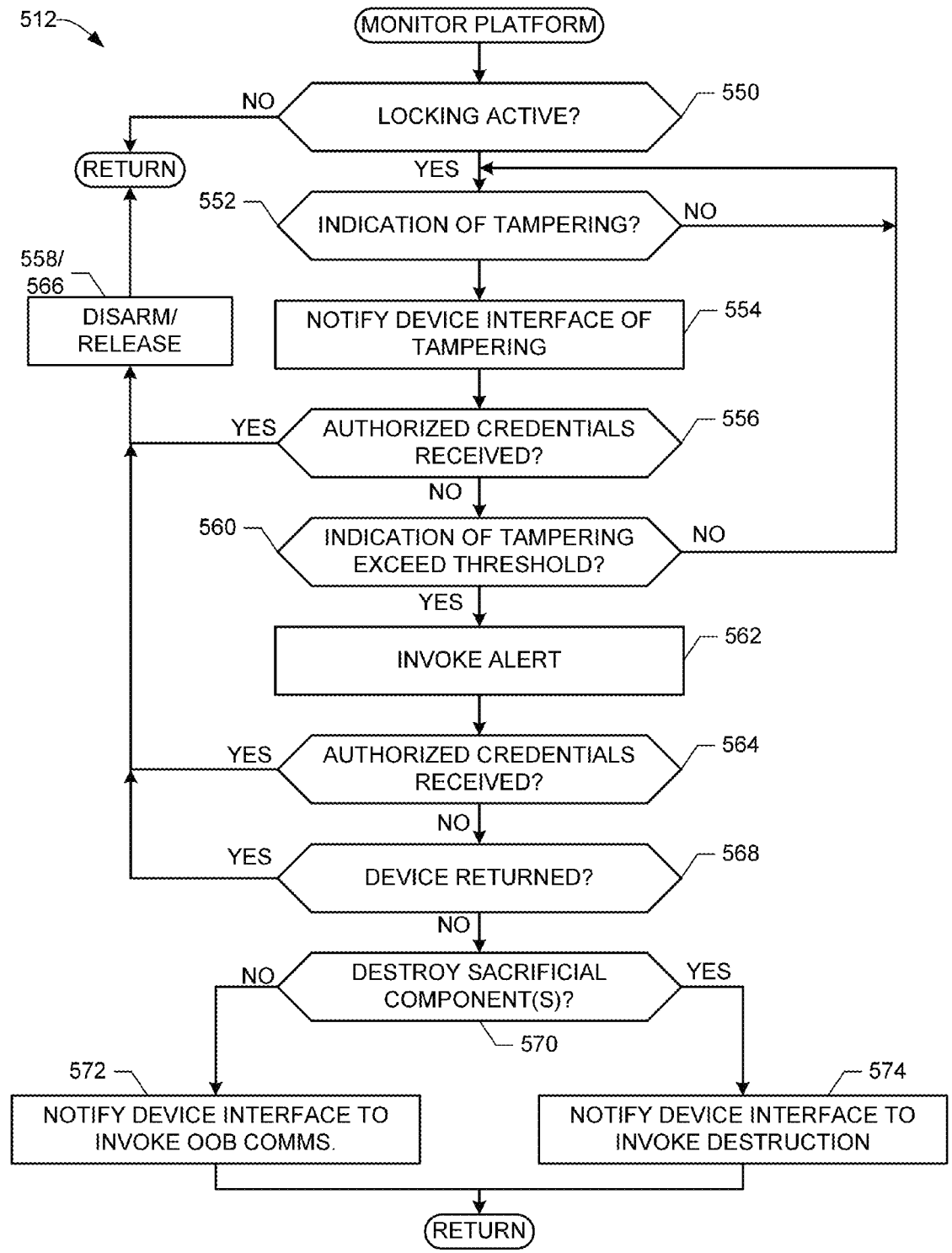

FIG. 5B includes additional detail related to platform monitoring (block 512). In the illustrated example of FIG. 5B, the platform locking manager 306 determines whether the detected device also has an active physical or virtual lock (block 550). If not, then the device is only using charging features of the example security platform (block 550) and control returns to block 502 of FIG. 5A. On the other hand, if the detected device is using locking services of the example security platform 104 (block 550), the example platform tampering manager 310 determines whether an instance of tampering occurs (block 552). As described above, tampering detection may be determined via one or more force sensors in the example platform locking module 214, such as strain gauges. Alternatively, in the event virtual locking is employed by the example security platform 104, then the example security interface 208 and/or the example platform communication interface 210 may use one or more RF signals (e.g., Bluetooth®, Wi-Fi®, NFC, etc.) to detect removal of the example device 106 from the example security platform 104.

In response to detecting an indication of tampering (block 552), the example platform communication interface 210 generates a notification prompt for display on the example platform interface 250 (block 554). Additionally or alternatively, the example platform communication interface 210 sends the indication of tampering to the example device security manager 224 so that the example device 106 can participate in one or more notification messages, such as audible warnings, visual light flashing and/or message displays on operating user interfaces of the example device 106 (e.g., a screen of a cell phone). The example notification prompt issues a warning depending on the type of tampering that has been detected. For example, if the detected tampering is associated with applied force to a device 106 that is physically locked to the security platform 104 (e.g., via a mechanical interlock, via an electromagnetic locking force, etc.), then the notification message informs the user (e.g., thief) that continued force must cease or damage will occur to the device 106. Additionally, the notification message provides an opportunity for the user to enter proper credentials to stop the physical locking activity (block 554) and, if the example platform security manager 212 receives an indication of properly provided credentials (block 556), the example platform locking manager 306 causes the physical lock to be released (block 558).

On the other hand, if the detected tampering is associated with virtual locking and an indication that the example device 106 is no longer in proximity to the example security platform 104 (block 552), then the example platform security manager 212 invokes a notification message informing the user (e.g., thief) that the device 106 must be returned to the security platform 104 to avoid further notification to security personnel, notification to law enforcement personnel and/or permanent damage to the device 106 (block 554). Additionally, the notification message also provides the user an opportunity to enter authorized credentials to disarm the virtual security measures (block 554) that, when properly entered (block 556) causes the example platform locking manager 306 to disarm the virtual locking security (block 558).

In the event authorized credentials are not entered (block 556), then the example platform tampering manager 310 determines whether the indication of tampering exceeds a first threshold value (block 560). If not, then the tampering behavior is deemed to have ceased (e.g., the device was returned to the security platform 104, the exertion of force has stopped, etc.) (block 560) and control returns to block 552. On the other hand, if the indication of tampering exceeds the threshold (block 560), then the example platform communication interface 210 invokes a secondary notification message with another prompt to enter authorized credentials (block 562). The example secondary notification message may include information related to imminent damage to the device if the tampering behavior continues or if authorized credentials are not provided. In the event authorized credentials are provided (block 564), then the example platform locking manager 306 disarms and/or otherwise releases the example device 106 (block 566). In the event authorized credentials are not provided (block 564), but the device is returned to the example security platform (block 568), the example platform locking manager 306 disarms and/or otherwise releases the example device 106 (block 566).

However, in the event that the authorized credentials are not provided (block 564) and the device is not returned to the example security platform (block 568), then the example platform security manager 212 determines whether to destroy the sacrificial components 226 (block 570). If the device 106 does not include sacrificial components and/or if a profile does not permit the destruction of the example sacrificial components 226 (block 570), then the example platform tampering manager 310 invokes the auxiliary communication module 406 to provide one or more notification messages using out-of-band (OOB) communications (block 572). If the device 106 includes sacrificial components 226 and a profile permits destruction of such components 226 (block 570), then the example platform tampering manager invokes the example self-destruction engine 414 to cause the example sacrificial components 226 to be crippled, incapacitated and/or otherwise destroyed so that the stolen device has minimal or no value to the thief (block 574).

Figure 6A:
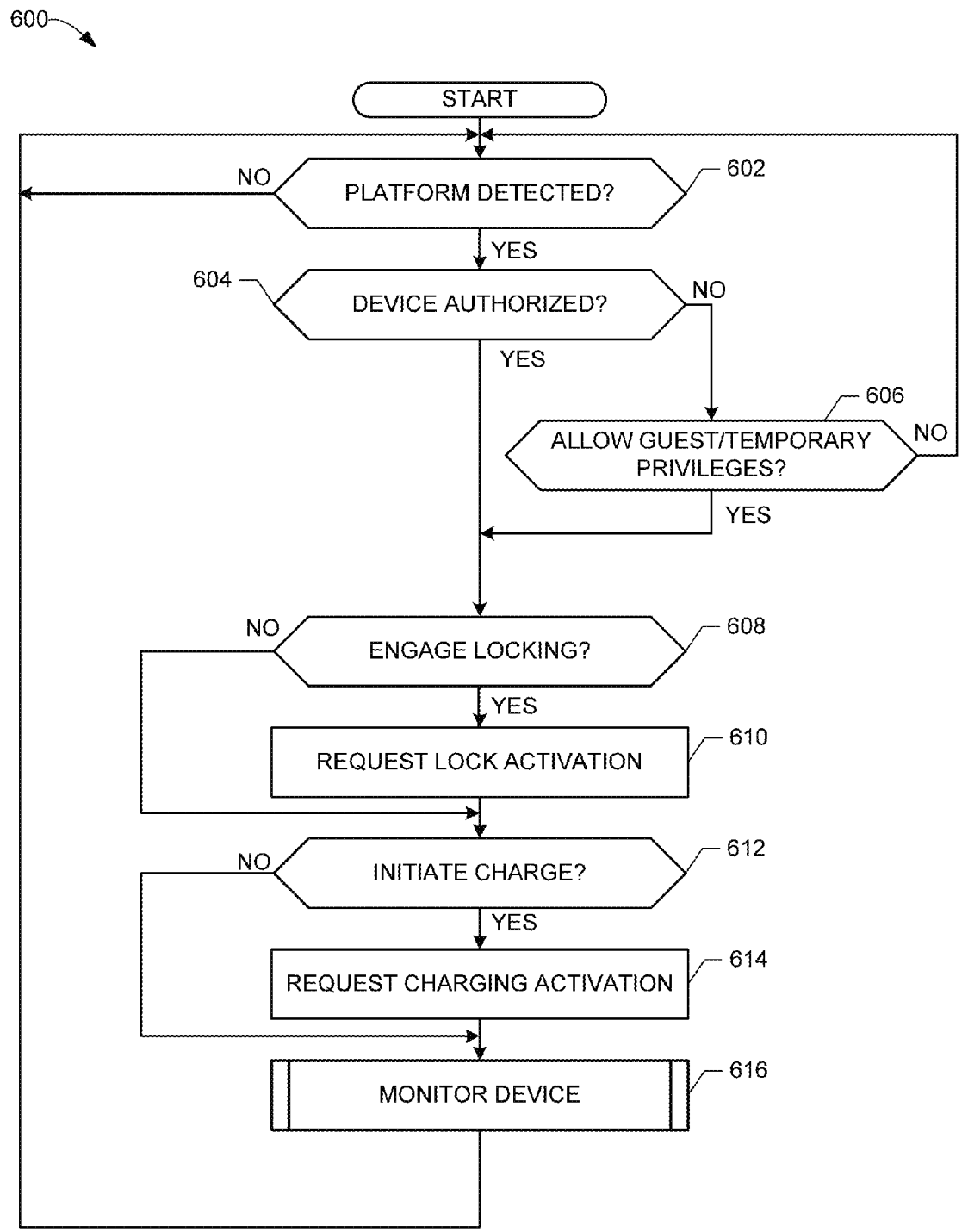
FIGS. 6A and 6B are flowcharts representative of example machine readable instructions that may be executed by a platform to secure a device in a manner consistent with the teachings of this disclosure.

The program 600 of FIG. 6A describes example operation of the example device 106 and the example device security manager 224 and begins at block 602 where the example platform detector 402 determines whether a platform is in the vicinity of the example device 106. If not, then the example platform detector 402 continues to monitor for a platform (block 602). In the event the example device security manager 224 identifies a platform in proximity to the example device 106 (block 602), the example device security manager 224 determines whether the device 106 is authorized to use any of the available services of the platform (block 604). If not, the platform 104 may still offer one or more services on a temporary or guest basis (block 606). Depending on a profile of the example device 106, the example device locking manager 404 determines whether to engage locking services (block 608) and invokes such services via a request to the example platform locking manager 306 (block 610).

In some examples, the device 106 may not be configured to utilize locking services (block 608) and the example device charging manager 408 determines whether charging services are to be invoked (block 612). If so, the example device charging manager 408 invokes a request to the example platform charging manager 308 to activate charging services (block 614). The device security manager 224 then monitors the example device conditions (block 616).

Figure 6B:
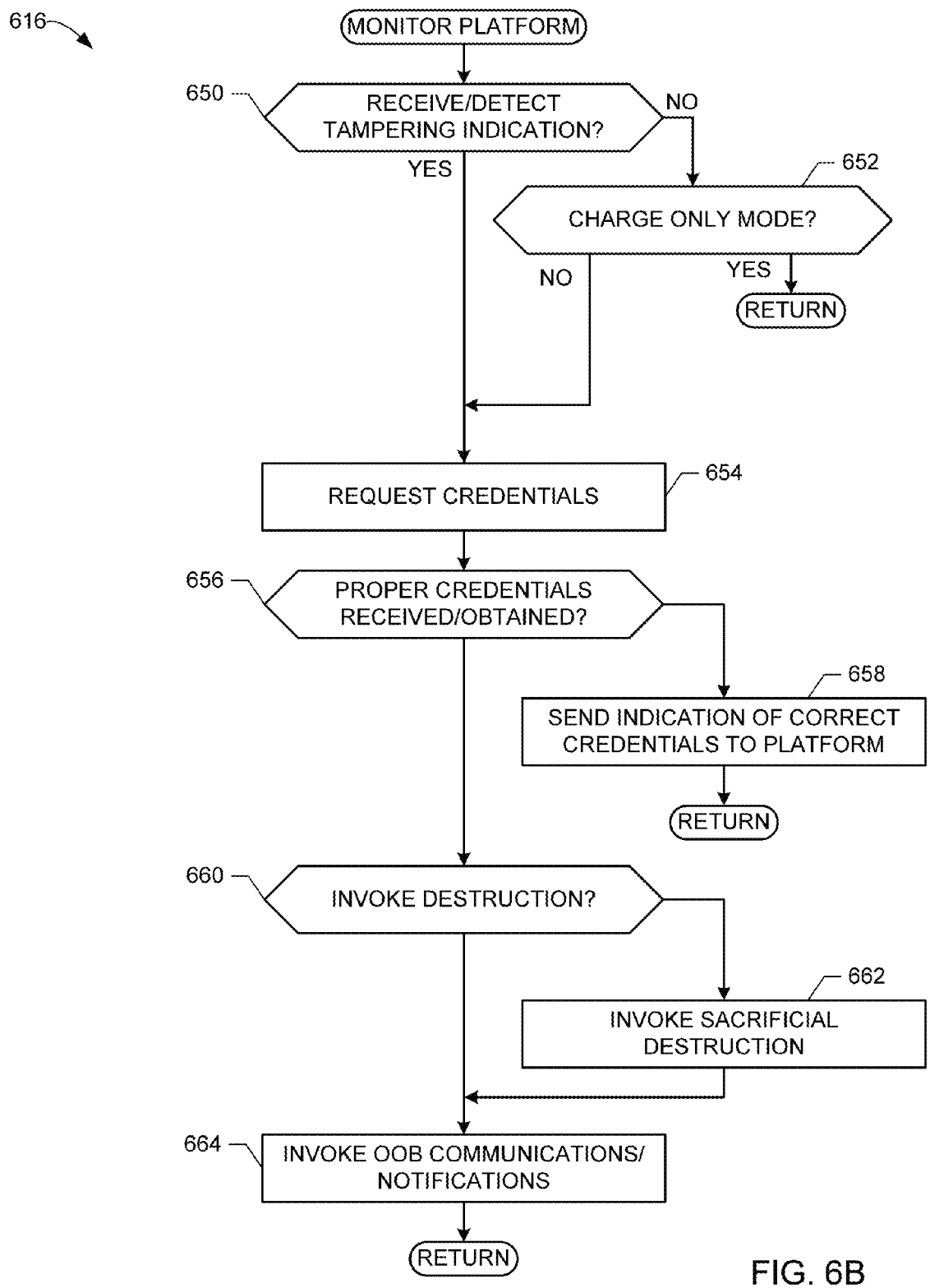

FIG. 6B includes additional detail related to device monitoring (block 616). In the illustrated example of FIG. 6B, the device tampering manager 410 determines whether an indication of tampering has been received and/or otherwise retrieved from the example platform security manager 212 (block 650). If the example device 106 is not using locking services, or if there is no indication of tampering (block 650), then the example device charging manager 408 determines whether charging functionality is the only service requested by the example device (block 652). If so, control returns to block 602 of FIG. 6A so that the device 106 can monitor for proximity to another platform.

In the event the example device tampering manager 410 receives an indication that tampering is occurring (block 650), then the example credential engine 412 invokes a request for authorized credentials (block 654). As described above, credentials may be entered via a user interface of the example device 106 or via the example platform interface 250. The example credential engine 412 determines whether authorized credentials have been received and/or otherwise retrieved (block 656) and, if so, then the example device security manager 224 sends an indication of correct credentials received to the example platform security manager 212 to cause the security service(s) to be disarmed and/or otherwise released (block 658). However, if the proper credentials are not received (block 656), then the example self-destruction engine 414 determines whether to invoke destruction services to disable the example sacrificial components 226 (block 660). If the example sacrificial components 226 are to be destroyed, disabled and/or otherwise rendered inoperable (block 660), then the example self-destruction engine 414 performs the destruction tasks on the example sacrificial components 226 (block 662).

In some examples, the example device 106 does not include sacrificial components 226 or such components are not to be destroyed (block 660), or after sacrificial components 226 are rendered inoperable the example auxiliary communication module 406 is invoked to transmit one or more notification messages via OOB communication devices, such as RF communication devices independent of the standard device 106 capabilities (block 664).

Figure 7:
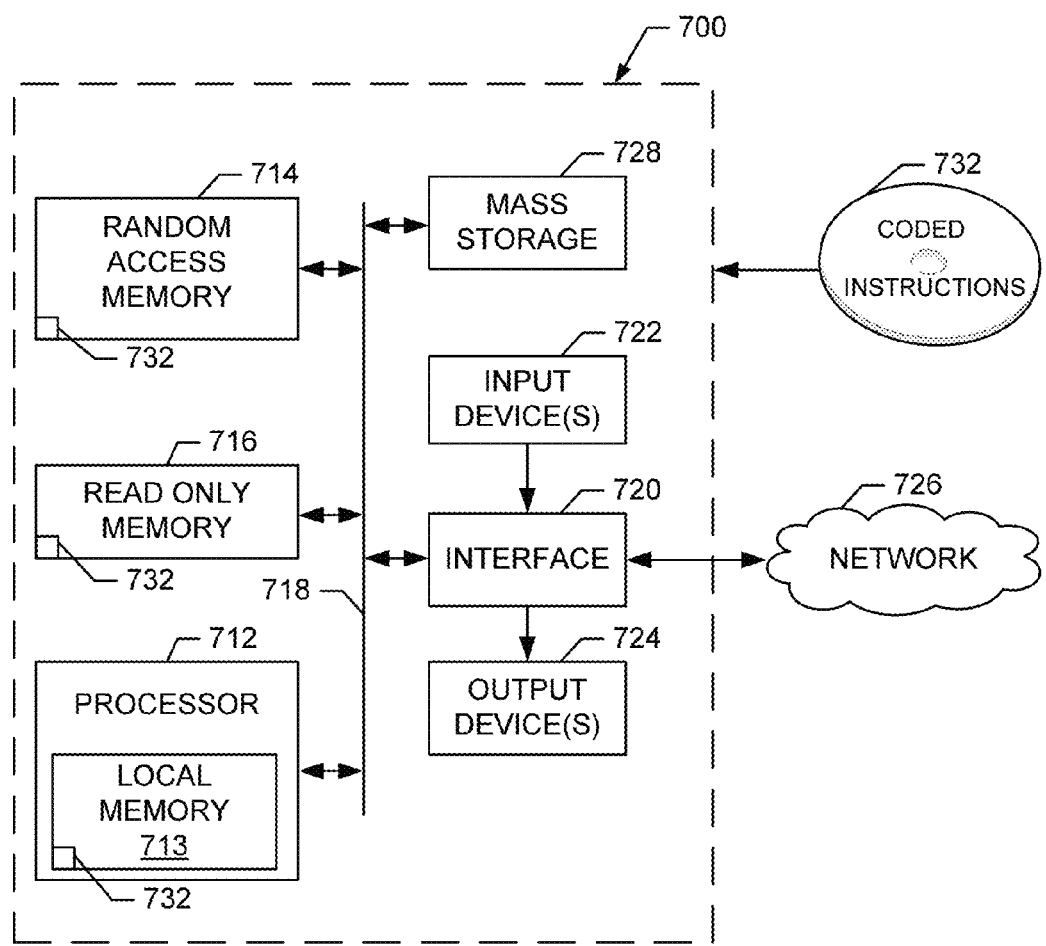
FIG. 7 is a schematic illustration of an example processor platform that may execute the instructions of FIGS. 5A, 5B, 6A and 6B to implement the example system of FIGS. 1-4.

FIG. 7 is a block diagram of an example processor platform 700 capable of executing the instructions of FIGS. 5A, 5B, 6A and 6B to implement the system 100 of FIGS. 1-4. The processor platform 700 can be, for example, a server, a personal computer, a mobile device (e.g., a cell phone, a smart phone, a tablet such as an iPad™), a personal digital assistant (PDA), an Internet appliance, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5A, 5B, 6A and 6B may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus, systems and articles of manufacture facilitate device security without cumbersome effects of cables used with locks and corresponding keys. Additionally, example disclosed methods, apparatus, systems and articles of manufacture disclose security solutions that discourage theft attempts for unattended devices and report one or more attempts of theft, whether they be successful or not. In the event the device is improperly moved from a monitored location, one or more self-destruction actions may occur after one or more warnings to return the device.

The following examples identify additional example methods, apparatus, systems and/or articles of manufacture disclosed herein. An example apparatus to secure a device includes a platform detector to determine when the device is within a threshold proximity to a platform, a device locking manager to initiate a locking service for the device when within the threshold proximity, and a device tampering manager to initiate a tampering remedy in response to detecting an indication of tampering. Other disclosed apparatus include examples where the device locking manager is to invoke a physical lock as the locking service, and a device locking module to engage a corresponding platform locking module to physically restrain the device to the platform. In some examples, the device locking module includes at least one of a magnetic component, a ferromagnetic material or a lock interface. In other examples, a credential engine to invoke a release of the physical lock in response to receipt of authorized credentials. In still other examples, the device tampering manager is to detect a first threshold force as the indication of tampering, in which a device locking module has a force sensor to generate force values between the device locking module and the platform, and in some instances the force sensor includes a strain gauge. In some examples, an auxiliary communication module is to generate a tampering message as the tampering remedy in response to the first threshold force, which may further include a self-destruction engine to incapacitate a sacrificial component of the device in response to detecting a second threshold force greater than the first threshold force. In other examples, a sacrificial component is connected to the physical lock, the sacrificial component to be destroyed in response to an applied force between the physical lock and the platform exceeding a threshold value. Some examples, the device locking manager is to invoke a virtual lock as the locking service, in which an auxiliary communication module to generate a tampering message as the tampering remedy in response to removal of the device from the platform, and the auxiliary communication module is to at least one of transmit a tampering e-mail message, transmit a tampering text message, invoke an audible alarm of the device or display a message on the device. In other examples, a credential engine is to prompt for authorized credentials in response to removal of the device from the platform, in which a self-destruction engine is to incapacitate a sacrificial component of the device if the authorized credentials are not received within a threshold duration.

An example method to secure a device includes determining when the device is within a threshold proximity to a platform, initiating a locking service for the device when within the threshold proximity, and initiating a tampering remedy in response to detecting an indication of tampering. In some examples, the method includes invoking a physical lock as the locking service in response to detecting the indication of tampering and engaging a corresponding platform locking module to physically restrain the device to the platform. In some examples, the platform locking module engages at least one of a magnetic component, a ferromagnetic material or a lock interface, while in other examples the method includes invoking a release of the physical lock in response to receipt of authorized credentials. Some example methods include detecting a first threshold force as the indication of tampering, and detecting force values between a locking module and the platform, in which a strain gauge detects the force values. In still other examples, the method includes generating a tampering message as the tampering remedy in response to the first threshold force, and incapacitating a sacrificial component of the device in response to detecting a second threshold force greater than the first threshold force. Some example methods include destroying a sacrificial component connected to the physical lock in response to an applied force between the physical lock and the platform exceeding a threshold value, in which a virtual lock is the locking service. Some methods include generating a tampering message as the tampering remedy in response to removal of the device from the platform, and at least one of, in response to the tampering message, transmitting a tampering e-mail message, transmitting a tampering text message, invoking an audible alarm of the device, or invoking a display message on the device. In still other examples, the method includes prompting for authorized credentials in response to removal of the device from the platform, and incapacitating a sacrificial component of the device if the authorized credentials are not received within a threshold duration.

An example disclosed computer readable storage medium includes instructions that, when executed, determine when the device is within a threshold proximity to a platform, initiate a locking service for the device when within the threshold proximity, and initiate a tampering remedy in response to detecting an indication of tampering. Some example disclosed instructions include invoking a physical lock as the locking service in response to detecting the indication of tampering and engaging a corresponding platform locking module to physically restrain the device to the platform. Some example instructions, when executed, engage at least one of a magnetic component, a ferromagnetic material or a lock interface, and invoke a release of the physical lock in response to receipt of authorized credentials. In still other example disclosed instructions, when executed, cause a machine to detect a first threshold force as the indication of tampering, and detect force values between a locking module and the platform, in which the force values are detected with a strain gauge. Some example instructions include generating a tampering message as the tampering remedy in response to the first threshold force, and incapacitating a sacrificial component of the device in response to detecting a second threshold force greater than the first threshold force. In other examples, instructions cause a machine to destroy a sacrificial component connected to the physical lock in response to an applied force between the physical lock and the platform exceeding a threshold value, and invoke a virtual lock as the locking service. Some example instructions, when executed, cause a machine to generate a tampering message as the tampering remedy in response to removal of the device from the platform, and to prompt for authorized credentials in response to removal of the device from the platform, and incapacitate a sacrificial component of the device if the authorized credentials are not received within a threshold duration.

An example disclosed system to secure a device includes means for determining when the device is within a threshold proximity to a platform, means for initiating a locking service for the device when within the threshold proximity, and means for initiating a tampering remedy in response to detecting an indication of tampering. In some examples, the system includes means for invoking a physical lock as the locking service in response to detecting the indication of tampering, and means for engaging a corresponding platform locking module to physically restrain the device to the platform. In other examples, the system includes means for engaging at least one of a magnetic component, a ferromagnetic material or a lock interface, and means for invoking a release of the physical lock in response to receipt of authorized credentials. In still other examples, the system includes means for detecting a first threshold force as the indication of tampering, means for detecting force values between a locking module and the platform, and means for detecting the force values via a strain gauge. Some example systems include means for generating a tampering message as the tampering remedy in response to the first threshold force, and means for incapacitating a sacrificial component of the device in response to detecting a second threshold force greater than the first threshold force. Other example systems include means for destroying a sacrificial component connected to the physical lock in response to an applied force between the physical lock and the platform exceeding a threshold value, means for invoking a virtual lock as the locking service, means for generating a tampering message as the tampering remedy in response to removal of the device from the platform, and means for, in response to the tampering message, at least one of transmitting a tampering e-mail message, transmitting a tampering text message, invoking an audible alarm of the device, or invoking a display message on the device. Some example systems include means for prompting for authorized credentials in response to removal of the device from the platform, and means for incapacitating a sacrificial component of the device if the authorized credentials are not received within a threshold duration.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to secure a device, comprising:
  a platform detector structured to determine when the device is within a threshold proximity to a platform;
  a device locking manager structured to, in response to the device being within the threshold proximity of the platform, automatically activate a physical lock to physically restrain the device to the platform; and
  a device tampering manager structured to initiate a tampering remedy in response to detecting an indication of tampering.

2. An apparatus as defined in claim 1, wherein the physical lock includes a device locking module engageable to a corresponding platform locking module.

3. An apparatus as defined in claim 1, further including a credential engine structured to release the physical lock in response to receipt of authorized credentials.

4. An apparatus as defined in claim 1, wherein the indication of tampering is an occurrence of a force satisfying a threshold.

5. An apparatus as defined in claim 4, further including a force sensor to generate a force value corresponding to the force to compare to the threshold.

6. An apparatus as defined in claim 4, further including a credential engine structured to prompt for authorized credentials in response to the occurrence of the force satisfying the threshold.

7. An apparatus as defined in claim 1, further including a sacrificial component connected to the physical lock, the sacrificial component to be destroyed in response to a force satisfying a threshold being applied between the physical lock and the platform.

8. A method to secure a device, comprising:
 determining, with a processor, when the device is within a threshold proximity to a platform;
 when the device is within the threshold proximity to the platform, activating, with the processor, a physical lock to physically restrain the device to the platform; and
 initiating, with the processor, a tampering remedy in response to detecting an indication of tampering.

9. A method as defined in claim 8, wherein the physical lock includes a device locking module engageable to a corresponding platform locking module.

10. A method as defined in claim 8, wherein the indication of tampering is an occurrence of a force satisfying a threshold.

11. A method as defined in claim 10, wherein the tampering remedy is a tampering message generated in response to the occurrence of the force satisfying the threshold.

12. A method as defined in claim 8, further including destroying a sacrificial component connected to the physical lock in response to a force satisfying a threshold being applied between the physical lock and the platform.

13. A method as defined in claim 10, further including, in response to the occurrence of the force satisfying the threshold, prompting for authorized credentials.

14. A method as defined in claim 8, further including releasing the physical lock in response to receipt of authorized credentials.

15. A machine accessible storage device or storage disk comprising instructions that, when executed, cause a machine to at least:
 determine when a device is within a threshold proximity to a platform;
 when the device is determined to be within the threshold proximity to the platform, activate a physical lock to physically restrain the device to the platform; and
 initiate a tampering remedy in response to detecting an indication of tampering.

16. A machine accessible storage device or storage disk as defined in claim 15, further including instructions that, when executed, cause the machine to incapacitate a sacrificial component connected to the physical lock in response to a force satisfying a threshold being applied between the physical lock and the platform.

17. A machine accessible storage device or storage disk as defined in claim 15, further including instructions that, when executed, cause the machine to release the physical lock in response to receipt of authorized credentials.

18. A machine accessible storage device or storage disk as defined in claim 15, wherein the indication of tampering is an occurrence of a force satisfying a threshold.

19. A machine accessible storage device or storage disk as defined in claim 18, further including instructions that, when executed, cause the machine, in response to the occurrence of the force satisfying the threshold, to prompt for authorized credentials.

20. A machine accessible storage device or storage disk as defined in claim 18, wherein the tampering remedy is a tampering message generated in response to the occurrence of the force satisfying the threshold.

\* \* \* \* \*